United States Patent
Kim

(10) Patent No.: US 7,259,821 B2
(45) Date of Patent: *Aug. 21, 2007

(54) IN-PLANE SWITCHING LCD DEVICE

(75) Inventor: Ik-Soo Kim, Kunpo-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/651,104

(22) Filed: Aug. 29, 2003

(65) Prior Publication Data

US 2004/0046919 A1 Mar. 11, 2004

Related U.S. Application Data

(63) Continuation of application No. 09/860,590, filed on May 21, 2001, now Pat. No. 6,661,492.

(30) Foreign Application Priority Data

May 23, 2000 (KR) ................. 2000-27850

(51) Int. Cl.
*G02F 1/1343* (2006.01)
(52) U.S. Cl. ........................ 349/141; 349/38
(58) Field of Classification Search ................ 349/141, 349/143, 38–43
See application file for complete search history.

(56) References Cited

U.S. PATENT DOCUMENTS

| | | | |
|---|---|---|---|
| 5,598,285 A | 1/1997 | Kondo et al. | |
| 5,680,190 A * | 10/1997 | Michibayashi et al. | ..... 349/140 |
| 5,838,037 A | 11/1998 | Masutani et al. | |
| 5,914,762 A | 6/1999 | Lee et al. | |
| 5,946,060 A | 8/1999 | Nishiki et al. | |
| 5,990,987 A | 11/1999 | Tanaka | |
| 6,014,190 A * | 1/2000 | Kim et al. | ................ 349/39 |
| 6,028,653 A | 2/2000 | Nishida | |
| 6,094,250 A * | 7/2000 | Choi et al. | ................ 349/141 |
| 6,097,454 A | 8/2000 | Zhang et al. | |
| 6,122,030 A * | 9/2000 | Nagata et al. | ............. 349/153 |

(Continued)

FOREIGN PATENT DOCUMENTS

JP 09-005764 1/1997

(Continued)

*Primary Examiner*—Dung T. Nguyen
(74) *Attorney, Agent, or Firm*—McKenna Long & Aldridge LLP

(57) ABSTRACT

The present invention discloses an IPS LCD device. The IPS LCD device according to the present invention implements a plurality of transparent common and pixel electrodes. Since the plurality of common and pixel electrodes are made from the transparent material on the same plane, the IPS LCD device has a high aperture ratio, a high brightness quality, and therefore a low power consumption. In another aspect, the IPS LCD device according to the present invention implements overlapped data line and outermost common electrode. To form the overlapped data line and outermost common electrode, an organic passivation layer is used such that cross talk between the data line and the outermost common electrode is prevented. Then, because the overlapped data line and outermost common electrode serve as a black matrix such that no black matrix is needed. Therefore, an aperture ratio of the IPS LCD device is further improved.

10 Claims, 10 Drawing Sheets

U.S. PATENT DOCUMENTS

| | | | |
|---|---|---|---|
| 6,351,300 B1 * | 2/2002 | Park et al. | 349/141 |
| 6,414,729 B1 * | 7/2002 | Akiyama et al. | 349/38 |
| 6,486,933 B1 * | 11/2002 | Cha et al. | 349/139 |
| 6,661,492 B2 * | 12/2003 | Kim | 349/141 |
| 6,924,865 B2 * | 8/2005 | Ohta et al. | 349/141 |
| 2004/0263754 A1 * | 12/2004 | Ahn et al. | 349/141 |

FOREIGN PATENT DOCUMENTS

| | | |
|---|---|---|
| JP | 09-073101 | 3/1997 |
| JP | 09-101538 | 4/1997 |
| JP | 09-105908 | 4/1997 |
| JP | 10-221705 | 8/1998 |
| JP | 11-119237 | 4/1999 |
| JP | 11-125836 | 5/1999 |
| KR | 100257369 | 2/2000 |
| KR | 10-2000-0025567 | 5/2000 |

* cited by examiner

Back light

IN-PLANE SWITCHING LCD DEVICE

This application is a continuation of prior application Ser. No. 09/860,590, filed May 21, 2001 now U.S. Pat. No. 6,661,492.

This application claims the benefit of Korean Patent Applications No. 2000-27850 filed on May 23, 2000, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal is generated in a plane parallel to a substrate.

2. Discussion of the Related Art

A typical liquid crystal display (LCD) device uses optical anisotropy and polarization properties of liquid crystal molecules. The liquid crystal molecules have a definite orientational order in alignment resulting from their thin and long shapes. The alignment orientation of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

Liquid crystal is classified into positive liquid crystal and negative liquid crystal, depending on the electrical properties of the liquid crystal. The positive liquid crystal has a positive dielectric anisotropy such that long axes of liquid crystal molecules are aligned parallel to an electric field. Whereas, the negative liquid crystal has a negative dielectric anisotropy such that long axes of liquid crystal molecules are aligned perpendicular to an electric field.

By now, active matrix LCDs, in which the thin film transistors and the pixel electrodes are arranged in the form of a matrix, are widely used because of their high resolution and superiority in displaying moving video data.

FIG. 1 is a cross-sectional view illustrating a typical twisted nematic (TN) LCD panel. As shown in FIG. 1, the TN LCD panel has lower and upper substrates 2 and 4 and an interposed liquid crystal layer 10. The lower substrate 2 includes a first transparent substrate 1a and a thin film transistor ("TFT") "S". The TFT "S" is used as a switching element to change orientation of the liquid crystal molecules. The lower substrate 2 further includes a pixel electrode 15 that applies an electric field to the liquid crystal layer 10 in accordance with signals applied by the TFT "S". The upper substrate 4 has a second transparent substrate 1b, a color filter 8 on the second transparent substrate 1b, and a common electrode 14 on the color filter 8. The color filter 8 implements color for the LCD panel. The common electrode 14 serves as another electrode for applying a voltage to the liquid crystal layer 10. The pixel electrode 15 is arranged over a pixel region "P," i.e., a display area. A transparent conductive material like indium tin oxide (ITO) having superior light transmittance is used for the pixel electrode 15. Further, to prevent leakage of the liquid crystal layer 10 between the lower and upper substrates 2 and 4, those substrates are sealed by a sealant 6.

As described above, because the pixel and common electrodes 15 and 14 of the related art TN LCD panel are positioned on the lower and upper substrates 2 and 4, respectively, the electric field induced therebetween is perpendicular to the lower and upper substrates 1a and 1b. The above-mentioned liquid crystal display device has advantages of high transmittance and aperture ratio, and further, since the common electrode on the upper substrate serves as an electrical ground, the liquid crystal is protected from a static electricity.

However, the above-mentioned operation mode of the TN LCD panel has a disadvantage of a narrow viewing angle. To overcome the above-mentioned problem, an in-plane switching (IPS) LCD panel was developed. The IPS LCD panel implements a parallel electric field that is parallel to the substrates, which is different from the TN or STN (super twisted nematic) LCD panel. A detailed explanation about operation modes of a typical IPS LCD panel will be provided with reference to FIGS. 2, 3A, 3B, 4A and 4B.

As shown in FIG. 2, first and second substrates 1a and 1b are spaced apart from each other, and a liquid crystal "LC" is interposed therebetween. The first and second substrates 1a and 1b are called an array substrate and a color filter substrate, respectively. Pixel and common electrodes 15 and 14 are disposed on the first substrate 1a. The pixel and common electrodes 15 and 14 are parallel with and spaced apart from each other. On a surface of the second substrate 1b, a color filter 25 is disposed opposing the first substrate 1a. The pixel and common electrodes 15 and 14 apply an electric field "E" to the liquid crystal "LC", then it is aligned parallel to the electric field "E".

FIGS. 3A and 3B conceptually illustrate "off state" operation modes for a typical IPS LCD device. In off state, the long axes of the LC molecules "LC" maintain a definite angle with respect to a line that is perpendicular to the pixel and common electrodes 15 and 14. The pixel and common electrode 15 and 14 are parallel with each other. Herein, the angle difference is 45 degrees, for example.

FIGS. 4A and 4B conceptually illustrate "on state" operation modes for the typical IPS LCD device. In an on state, an in-plane electric field "E", which is parallel with the surface of the first substrate 1a, is generated between the pixel and common electrodes 15 and 14. The reason is that the pixel electrode 15 and common electrode 14 are formed together on the first substrate 1a. Then, the LC molecules "LC" are twisted such that the long axes thereof coincide with the electric field direction. Thereby, the LC molecules "LC" are aligned such that the long axes thereof are perpendicular to the pixel and common electrodes 15 and 14.

By the above-mentioned operation modes and with additional parts such as polarizers and alignment layers, the IPS LCD device displays images. The IPS LCD device has wide viewing angle and low color dispersion. Specifically, the viewing angle of the IPS LCD device is about 70 degrees in direction of up, down, right, and left. In addition, the fabricating processes of this IPS LCD device are simpler than other various LCD devices. However, because the pixel and common electrodes are disposed on the same plane of the lower substrate, the transmittance and aperture ratio are low. In addition, the IPS LCD device has disadvantages of a relatively slow response time and a relatively small alignment margin. Because of the small alignment margin, the IPS LCD device needs a uniform cell gap.

The IPS LCD device has the above-mentioned advantages and disadvantages. Users may or may not select an IPS LCD device depending on the intended use.

Now, with reference to FIGS. 5, and 6A to 6D, a fabricating process for a related art IPS LCD device is provided. FIG. 5 is a plan view illustrating a unit pixel region "P" of related art IPS LCD device. As shown, a gate line 50 and a common line 54 are arranged parallel to each other, and a data line 60 is arranged perpendicular to the gate and common lines 50 and 54. Near a cross point of the gate and data lines 50 and 60, a gate electrode 52 and a source electrode 62 are disposed. The gate and source electrodes 52 and 62 integrally communicate with the gate line 50 and the data line 60, respectively. The source electrode 62 overlaps a portion of the gate electrode 52. In addition, a drain electrode 64 is disposed opposite to the source electrode 62 with an interval therebetween.

A plurality of common electrodes 54a are disposed perpendicular to the common line 54 and connected to the common line. The plurality of common electrodes 54a are spaced apart from each other with an equal interval therebetween. A first connecting line 66 integrally communicates with the drain electrode 64, and a plurality of pixel electrodes 66a are disposed perpendicular to the first connecting line 66. First ends of the pixel electrodes 66a are connected with the first connecting line 66, and the second ends of the pixel electrodes 66a are connected with a second connecting line 68 that is disposed over the common line 54. The plurality of common electrodes 54a and the pixel electrodes 66a are spaced apart from each other and arranged in an alternating pattern. Therefore, each common electrode 54a is parallel to an adjacent pixel electrode 66a.

FIGS. 6A to 6D illustrate a sequence of fabricating processes for an array substrate 1 of the above-mentioned IPS LCD device.

As shown in FIG. 6A, on the array substrate 1, a first metal layer is deposited and patterned to form the gate electrode 52 and the plurality of common electrodes 54a. The first metal layer is selected from a group consisting of chromium (Cr), aluminum (Al), aluminum alloy (Al alloy), molybdenum (Mo), tantalum (Ta), tungsten (W), antimony (Sb), and alloys thereof.

As shown in FIG. 6B, a gate-insulating layer 70 is formed on the array substrate 1 to cover the gate and common electrodes 52 and 54a, and on the gate-insulating layer 70, an active layer 72 is formed over gate electrode 52. The gate-insulating layer 70 is silicon nitride (SiNx) or silicon oxide (SiO$_2$), while the active layer 72 includes an amorphous silicon layer (not shown) and a doped amorphous silicon layer (not shown).

As shown in FIG. 6C, a second metal layer is deposited and patterned to form the source and drain electrodes 62 and 64 on the active layer 72 and the pixel electrodes 66a on the gate-insulating layer 70. The pixel electrodes 66a are spaced apart from the adjacent common electrode 54a by a distance "L".

As shown in FIG. 6D, a passivation layer 74 is formed to cover the source, drain, and pixel electrodes 62, 64, and 66a. The passivation layer 74 serves to protect the source, drain, and pixel electrodes 62, 64, and 66a from exterior humidity or contaminants.

As described above, the common and pixel electrodes 54a and 66a of the IPS LCD device are arranged in the same plane such that an in-plane electric field is applied parallel with the substrate 1. Though the IPS LCD device has an advantage of wide viewing angle, the aperture ratio and luminance of the IPS LCD panel are much lower than that of the LTN or STN LCD device. The common and pixel electrodes of the IPS LCD device are disposed on the same plane and are made from opaque metals. Therefore, large portions of light are reflected by the opaque metal, which causes the low aperture ratio. In addition, since the low aperture ratio results in a low brightness quality of the liquid crystal display device, incident light from a back light unit (not shown) must be brighter than in other devices to compensate for the low brightness quality of the IPS LCD device. Therefore, power consumption of the IPS LCD device increases.

In the U.S. Pat. No. 5,946,060, Nishiki, et al. teach a combined LCD device having advantages of the conventional TN LCD device and IPS LCD device. FIG. 7 shows the above-mentioned combined LCD device. A data line 60 and a first electrode 80 are disposed on a lower substrate 1a with a first interval between the data line 60 and the first electrode 80. An insulating layer 72 covers the data line 60 and the first electrode 80 on the lower substrate 1a. On the insulating layer 72, a second electrode 84 and a third electrode 86 are disposed with a second interval therebetween. Whereas, a counter electrode 90 is disposed on an upper substrate 1b such that the counter electrode 90 opposes the second and third electrodes 84 and 86 of the lower substrate 1a. The lower and upper substrates 1a and 1b oppose with each other, and a liquid crystal layer 10 is interposed therebetween.

The above-mentioned combined LCD device selectively adopts a first electric field "E1" and a second electric field "E2", which are different from each other. The first electric field "E1" is applied perpendicular to the lower and upper substrates 1a and 1b, whereas the second electric field "E2" is applied parallel thereto. When the first electric field "E1" is applied between the counter electrode 90 and the first electrode 80, molecules of the liquid crystal layer 10 are aligned perpendicular to the lower and upper substrates 1a and 1b. Therefore, a first liquid crystal portion 10a is present between the lower and upper substrates 1a and 1b. On the contrary, when the second electric field "E2" is applied between the second electrode 84 and the third electrode 86, molecules of the liquid crystal layer 10 are aligned parallel to the lower and upper substrates 1a and 1b. In that case, a second liquid crystal portion 10b is present between the lower and upper substrates 1a and 1b. The first liquid crystal portion 10a corresponds to the TN mode shown in FIG. 1, whereas the second liquid crystal portion 10b corresponds to the IPS mode shown in FIG. 2. That is to say, the combined LCD device of FIG. 7 serves as the TN LCD device as well as the IPS LCD device depending on user's desired use.

However, compared with the conventional IPS LCD device and TN LCD device, the above-mentioned combined LCD device needs additional elements and fabricating process. In addition, though the TN mode by the first liquid crystal portion 10a selectively substitutes for the IPS mode, the IPS mode by the second liquid crystal portion 10b yet has the problems of the conventional IPS LCD device.

SUMMARY OF THE INVENTION

Accordingly, the present invention is directed to an IPS LCD device that substantially obviates one or more of the problems due to limitations and disadvantages of the related art.

An object of the present invention is to provide an IPS LCD device having a high aperture ratio, a high brightness quality, and therefore a low power consumption.

Another object of the present invention is to provide an IPS LCD device having an organic passivation layer such that cross talk is prevented between a data line and a common electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the first preferred embodiment of the present invention provides an array substrate for an IPS LCD device. The IPS LCD device includes: first and second substrates; a gate line and a common line on the first substrate; a data line perpendicular to the gate line; a thin film transistor at a crossing portion between the gate and data lines, the thin film transistor having gate, source, and drain electrodes; a first insulating layer on the gate line; a second insulating layer on the first substrate, the second insulating layer having at least one contact hole; a plurality of transparent common electrodes on the second insulating layer; a plurality of transparent pixel electrodes on the second insulating layer; a transparent auxiliary pixel electrode on the second insulating layer and is electrically connected with the drain electrode via the contact hole; and a liquid crystal layer between the first and second substrates.

The IPS LCD device further includes a capacitor electrode on the first insulating layer. The capacitor electrode is preferably the same material as the source and drain electrodes, and one end of the pixel electrode preferably overlaps the capacitor electrode.

The IPS LCD device further includes a transparent auxiliary common electrode on the second insulating layer. The auxiliary common electrode preferably overlaps the common line and is electrically connected with the common line via the contact hole.

In the IPS LCD device, an outermost common electrode adjacent to the data line preferably overlaps a portion of the data line. The common and pixel electrodes are preferably selected from a group consisting of indium tin oxide (ITO) and indium zinc oxide (IZO).

The IPS LCD device further includes a black matrix on the same layer as the gate line.

The second insulating layer is preferably selected from a group consisting of silicon oxide (SiOx) and silicon nitride (SiNx).

In another aspect, the second insulating layer is an organic material. The organic material is preferably selected from a group consisting of benzocyclobutene (BCB) and acryl resin.

In another aspect, the present invention provides a method of fabricating an IPS LCD device. The method includes: depositing and patterning a first metal on a substrate to form a common line and a gate line, the gate line including a gate electrode; forming a first insulating layer to cover the first metal; forming an active layer on the first insulating layer; depositing and patterning a second metal on the first insulating layer to form a data line, a source electrode, and a drain electrode, the data line being perpendicular to the gate line; forming a second insulating layer on an overall surface of the substrate to cover the second metal and the active layer, the second insulating layer having at least contact hole; and depositing and patterning a transparent conductive material on the second insulating layer such that a plurality of common electrodes, an auxiliary pixel electrode, and a plurality of pixel electrodes are formed on the same plane, wherein the auxiliary pixel electrode is electrically connected with the drain electrode via the contact hole.

A capacitor electrode is further formed on the first insulating layer in the step of patterning the first metal, and one end of the pixel electrode preferably overlaps the capacitor electrode.

An auxiliary common electrode is further formed on the second insulating layer in the step of patterning the transparent conductive material. The auxiliary common electrode preferably overlaps the common line and is electrically connected with the common line via the contact hole.

An outermost common electrode adjacent to the data line overlaps a portion of the data line.

The common and pixel electrodes are selected from a group consisting of indium tin oxide (ITO) and indium zinc oxide (IZO).

The method further includes a steps of forming a black matrix on the same layer as the gate line such.

The second insulating layer is preferably selected from a group consisting of silicon dioxide ($SiO_2$) and silicon nitride ($SiN_x$).

In another aspect, the second insulating layer is an organic material. The organic material is preferably selected from a group consisting of benzocyclobutene (BCB) and acryl resin.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Generally, the low brightness quality of a conventional IPS LCD device results from opaque pixel and common electrodes formed on the same plane. That is to say, because the opaque pixel and common electrodes of the conventional IPS LCD device shield light emitted from a back light unit, the conventional IPS LCD device has a lower brightness quality than a typical TN LCD device. To avoid the above-mentioned problem, the present invention provides an inventive IPS LCD device adopting transparent pixel and common electrodes formed on the same plane.

First Preferred Embodiment

Figure 8:
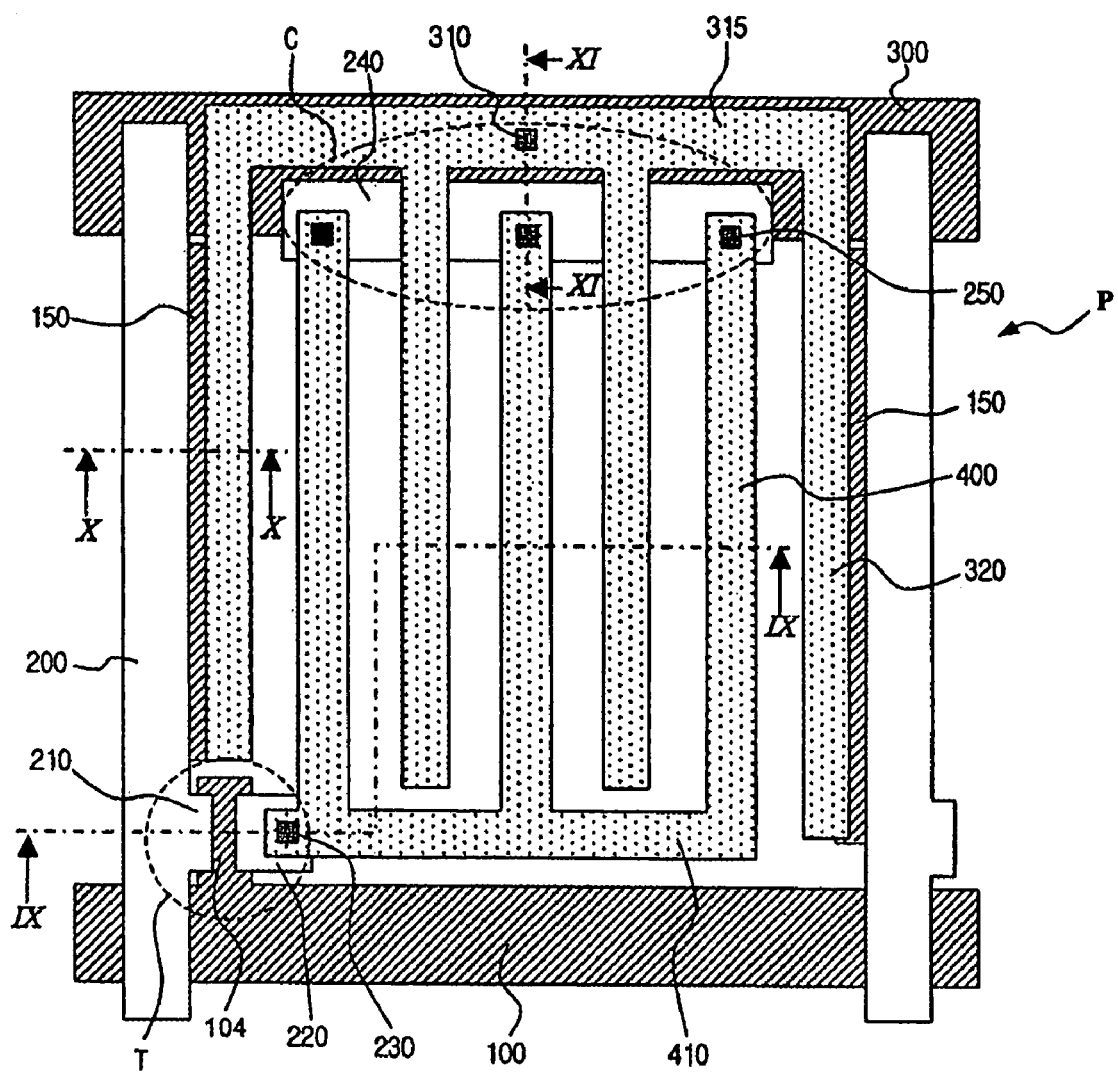
FIG. 8 is a plan view illustrating a unit pixel region of an IPS LCD device according to the first preferred embodiment of the present invention.

FIG. 8 is a plan view illustrating a unit pixel region "P" of an IPS LCD device according to the first preferred embodiment.

As shown, a gate line 100 and a common line 300 are transversely arranged, and a data line 200 is arranged perpendicular to the gate and common lines 100 and 300. Near a cross point of the gate and data lines 100 and 200, a gate electrode 104 and a source electrode 210 are disposed. The gate and source electrodes 104 and 210 integrally communicate with the gate line 100 and the data line 200, respectively. The source electrode 210 overlaps a portion of the gate electrode 104. In addition, a drain electrode 220 is disposed opposite to the source electrode 210 with an interval therebetween. The drain electrode 220 also overlaps a portion of the gate electrode 104 such that the gate, source, and drain electrodes 104, 210, and 220 compose a thin film transistor "T".

A plurality of pixel electrodes 400 spaced apart from each other are disposed perpendicular to the gate and common lines 100 and 300. An auxiliary pixel electrode 410 parallel to the gate line 100 is integrally connected with the plurality of pixel electrodes 400. The auxiliary pixel electrode 410 electrically contacts the drain electrode 220 via a drain contact hole 230. In addition, a plurality of common electrodes 320 spaced apart from each other are disposed perpendicular to the gate and common lines 100 and 300. An auxiliary common electrode 315 parallel to the common line 300 is integrally connected with the plurality of common electrodes 320. At this point, the plurality of pixel and common electrodes 400 and 320 are alternately arranged with a predetermined interval between adjacent pixel and common electrodes. The pixel and common electrodes 400 and 320 are made of a transparent conductive material on the same plane. The transparent conductive material is preferably selected from a group consisting of indium tin oxide (ITO) and indium zinc oxide (IZO).

Over the common line 300, a capacitor electrode 240 is formed with an insulating material (not shown) insulating it. The capacitor electrode 240 is electrically connected with the pixel electrode 400 via a capacitor contact hole 250. At this point, the plurality of pixel electrodes 400 extend to the capacitor electrode 240 such that the pixel electrodes 400 overlap portions of the capacitor electrode 240. The capacitor electrode 240 and a portion of the common line 300 are used as first and second electrodes of a storage capacitor "C".

Between the data line 200 and an outermost common electrode 320 or pixel electrode 400, a black matrix 150 made from the same material as the gate line 100 is formed to cover an interval therebetween. The black matrix 150 is disposed below the data line 200 and the outermost common electrode 320 or pixel electrode 400, and is insulated by an insulating material (not shown).

As previously described, for the IPS LCD device according to the first preferred embodiment, the pixel and common electrodes 400 and 320 are made from the same transparent conductive material, and the black matrix 150 is formed on an array substrate (reference 110 of FIG. 9), where the gate line 100 is formed. Because the transparent conductive material is used for both the pixel and common electrodes 400 and 320, the efficiency of a back light unit is improved such that the IPS LCD device according to the first preferred embodiment has a relatively high brightness quality. That is to say, because the transparent pixel and common electrodes 400 and 320 transmit most of the light from the back light unit, a high aperture ratio is achieved such that the brightness quality of the IPS LCD device is improved over conventional devices.

In addition, the IPS LCD device according to the first preferred embodiment uses the black matrix 150 formed on the array substrate (reference 110 of FIG. 9) where the gate line 100 is formed. That is to say, the black matrix 150 is formed directly on the array substrate 110, where light leakage occurs through the above-mentioned interval between the data line and the outermost common or pixel electrode. Compared to a conventional IPS LCD device having the black matrix on a color filter substrate, which will be attached over the array substrate, the present IPS LCD device needs a relatively reduced alignment margin for fabrication. Therefore, the black matrix 150 can have a relatively reduced size than that of the conventional IPS LCD device such that a high aperture ratio is achieved.

As explained above, the first preferred embodiment of the present invention provides high aperture ratio structure to avoid the low brightness quality associated with conventional ISP LCD devices.

Figure 1:
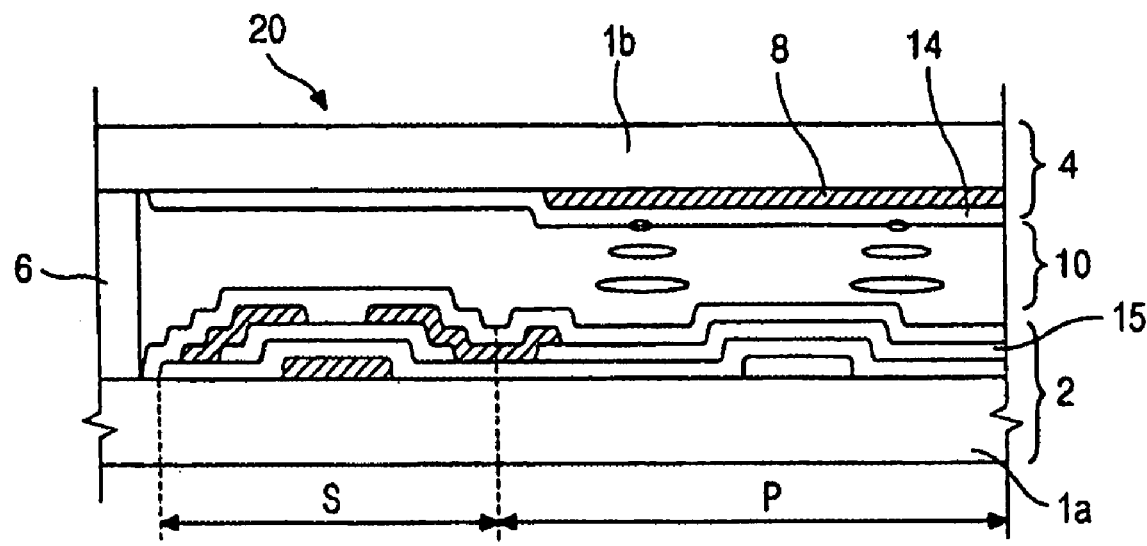
FIG. 1 is a cross-sectional view illustrating a typical liquid crystal display device.
Figure 2:
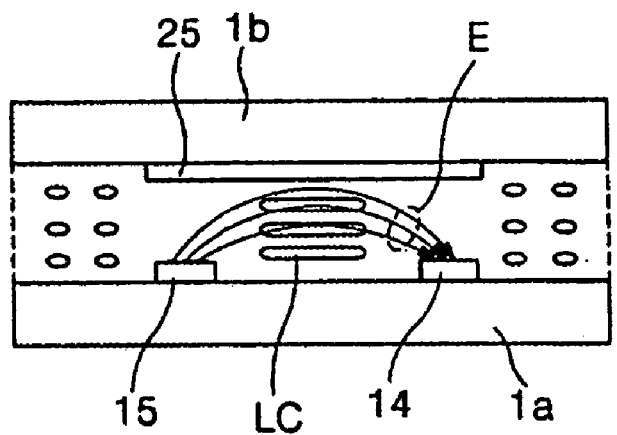
FIG. 2 is a cross-sectional view illustrating a typical IPS LCD device.
Figure 3A:
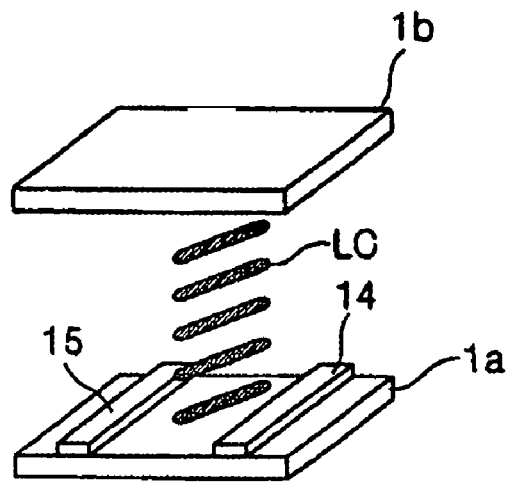
FIGS. 3A and 4A are perspective views illustrating operation modes of the typical IPS LCD device of FIG. 2.
Figure 3B:
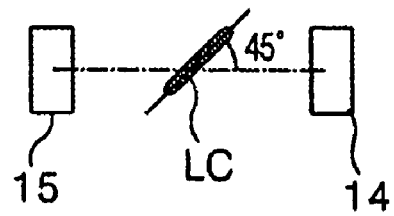
FIGS. 3B and 4B are plan views illustrating the operation modes of FIGS. 3A and 4A, respectively.
Figure 4A:
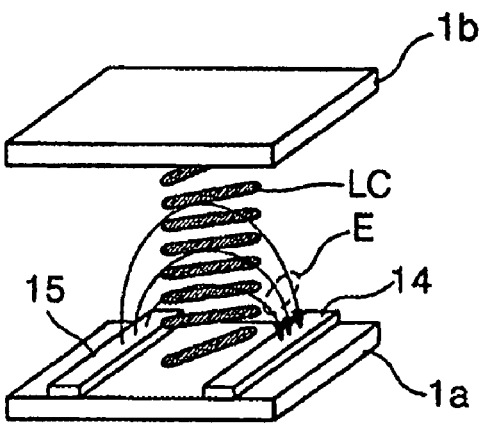
Figure 4B:
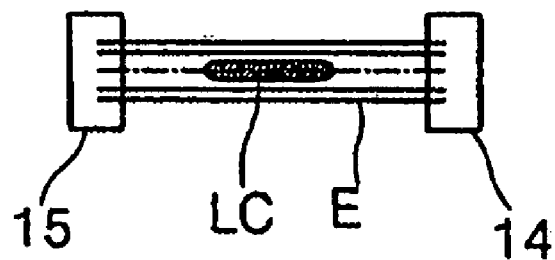
Figure 5:
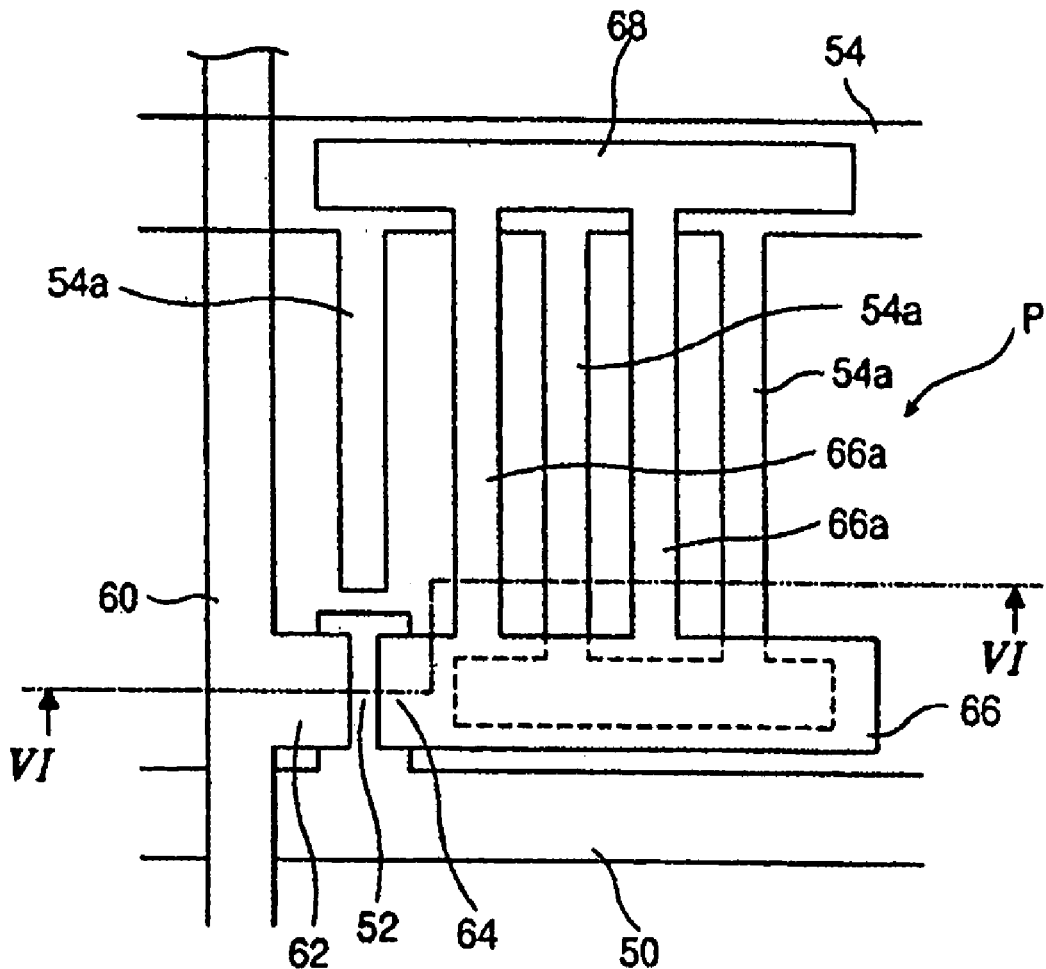
FIG. 5 is a plan view illustrating a unit pixel region of a related art IPS LCD device.
Figure 6A:
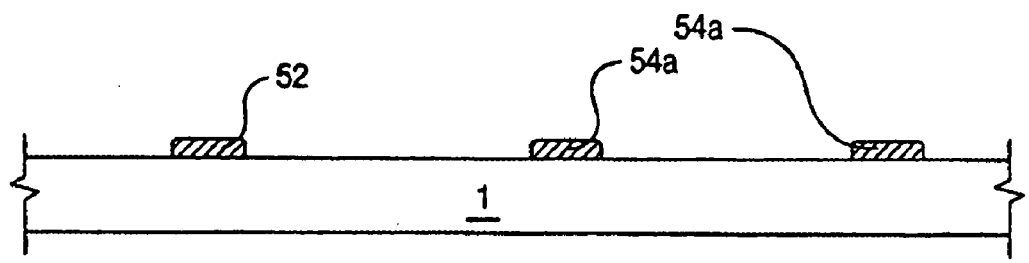
FIGS. 6A to 6D are sequential cross-sectional views taken along a line "VI-VI" of FIG. 5.
Figure 6B:
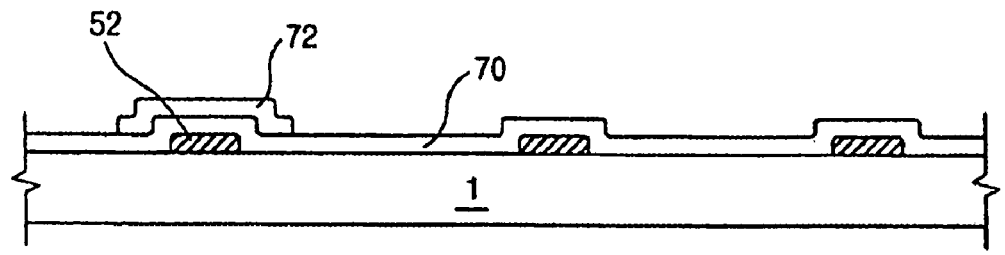
Figure 6C:
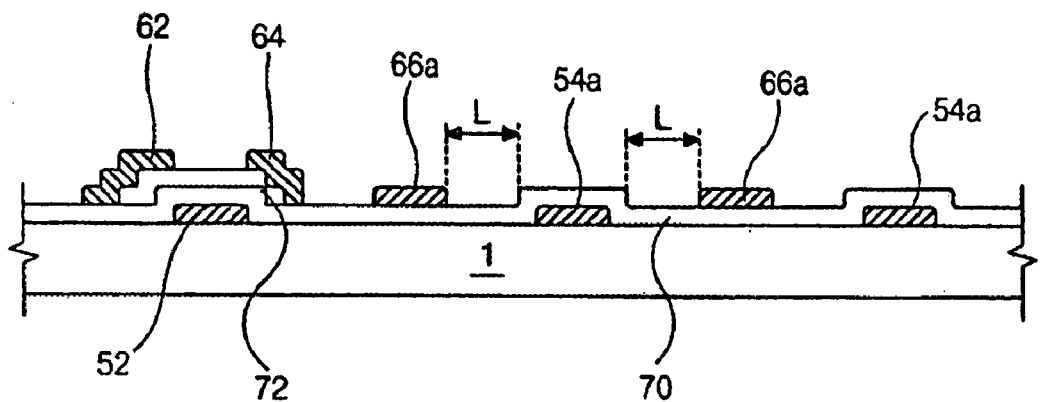
Figure 6D:
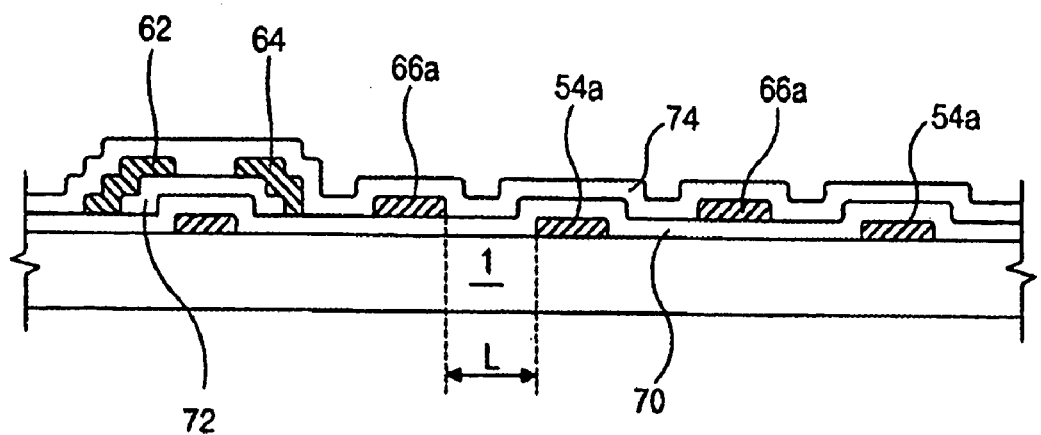
Figure 7:
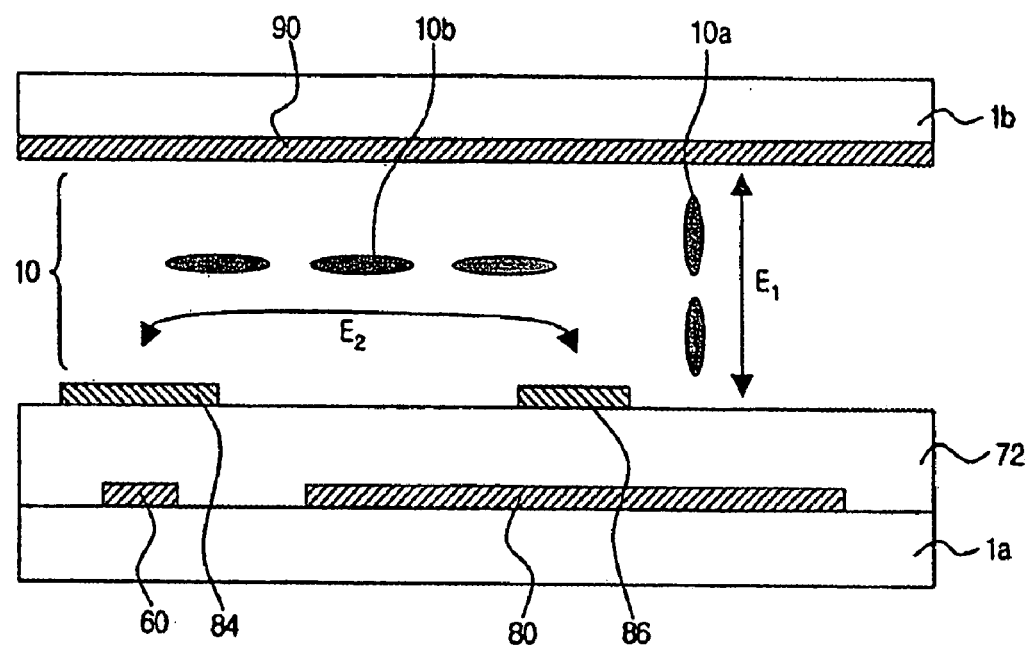
FIG. 7 is a cross-sectional view illustrating a conventional combined LCD device according to the U.S. Pat. No. 5,946,060.
Figure 9:
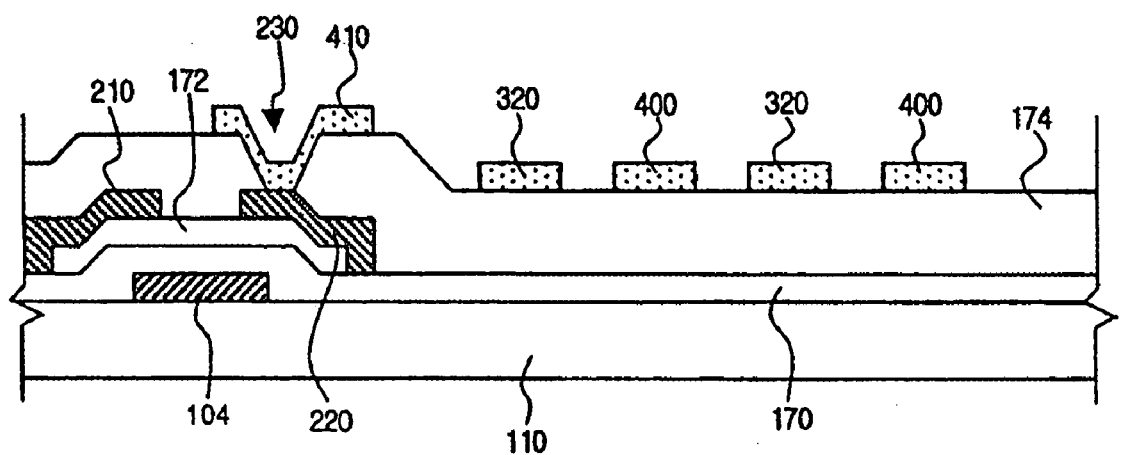
FIG. 9 is a cross-sectional view taken along a line "IX-IX" of FIG. 8.

FIG. 9 is a cross-sectional view taken along a line "IX-IX" of FIG. 8. The IPS LCD device of FIG. 9 is different from the conventional IPS LCD device of FIG. 6D in that the pixel and common electrodes 400 and 320 are formed on the same plane. As shown, the gate line 100 and gate electrode 104, a gate-insulating layer 170, an active layer 172, and the source and drain electrodes 210 and 220 are sequentially formed on the substrate 110 such that the thin film transistor "T" of FIG. 8 is formed. To cover the thin film transistor, a passivation layer 174 is formed over the substrate 110. At this point, the passivation layer 174 has the drain contact hole 230, which exposes a portion of the drain electrode 220. The plurality of pixel and common electrodes 400 and 320, the auxiliary pixel electrode 410, and the auxiliary common electrode (reference 315 of FIG. 8) are formed on the passivation layer 174. The auxiliary pixel electrode 410 electrically contacts the drain electrode 220 via the drain contact hole 230.

At this point, the plurality of pixel electrodes 400 are integrally connected with the auxiliary pixel electrode 410, as shown in FIG. 8. The pixel and common electrodes 400 and 320 are made of the same transparent conductive material on the same plane, i.e., the passivation layer 174. The passivation layer 174 is preferably an inorganic insulating material including silicon dioxide ($SiO_2$) and silicon nitride ($SiN_x$).

Figure 10:
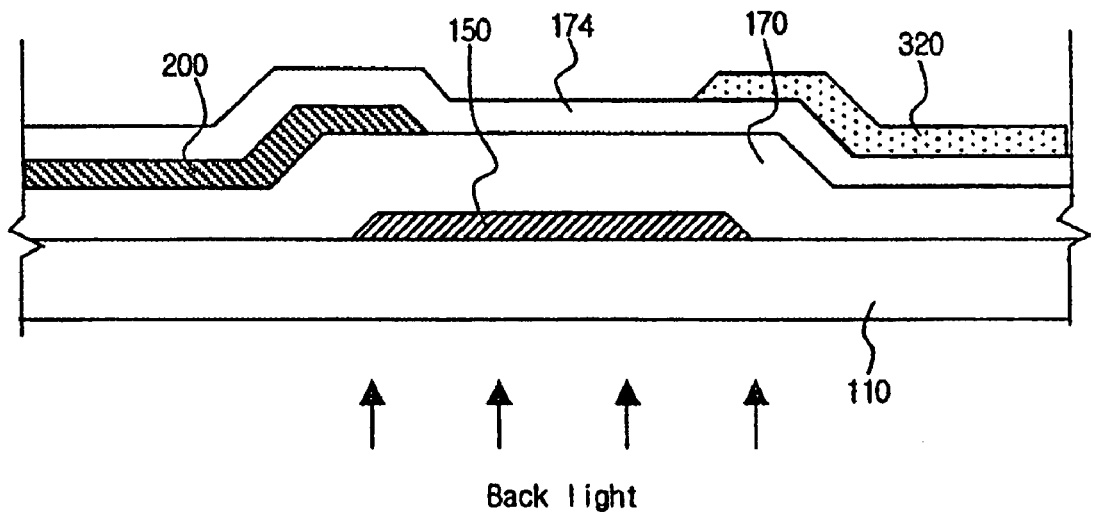
FIG. 10 is a cross-sectional view taken along a line "X-X" of FIG. 8;.

FIG. 10 is a cross-sectional view taken along a line "X-X" of FIG. 8. With reference to FIG. 10, the structure of the black matrix 150 is explained. As previously explained, the black matrix 150 is formed on the substrate 110 where the thin film transistor is formed, and the gate-insulating layer 170 covers the black matrix 150. The data line 200 is formed on the gate-insulating layer 170. The passivation layer 174 covers the data line 200, and the common electrode 320 is formed on the passivation layer 174.

At this point, an interval is present between the common electrode 320 and the data line 200, and the black matrix 150 covers the interval between the data line 200 and the common electrode 320. Therefore, light leakage through the interval is prevented by the black matrix 150.

Compared with the previously mentioned conventional IPS LCD device having the black matrix on a color filter substrate, the present IPS LCD device needs a relatively reduced alignment margin for fabrication. Therefore, the black matrix 150 can have a relatively smaller size than that of the conventional IPS LCD device such that a high aperture ratio is achieved. A detailed explanation will be provided subsequently.

A black matrix of the conventional LCD device is formed on the color filter substrate having a color filter, although light leakage occurs through the array substrate having the thin film transistor, which causes various intervals through which light can escape. An alignment margin is needed for attaching the array substrate and the color filter substrate, unless a very difficult fabrication process is used. The alignment margin of the attaching process involves use of a larger black matrix, or else the black matrix on the color filter substrate cannot prevent light leak through the array substrate. Then, the large black matrix causes a low aperture ratio in the conventional LCD device. To avoid the above-mentioned problem, the first preferred embodiment provides the black matrix on the array substrate such that the above-mentioned alignment margin has little effect on the size of the black matrix. That is to say, because the black matrix is fixed on the array substrate during the attaching process, the alignment margin for attaching the two different substrates is not important. Therefore, the IPS LCD device according to the first preferred embodiment has the relatively smaller black matrix than that of the conventional LCD device such that a relatively high aperture ratio is achieved.

Figure 11:
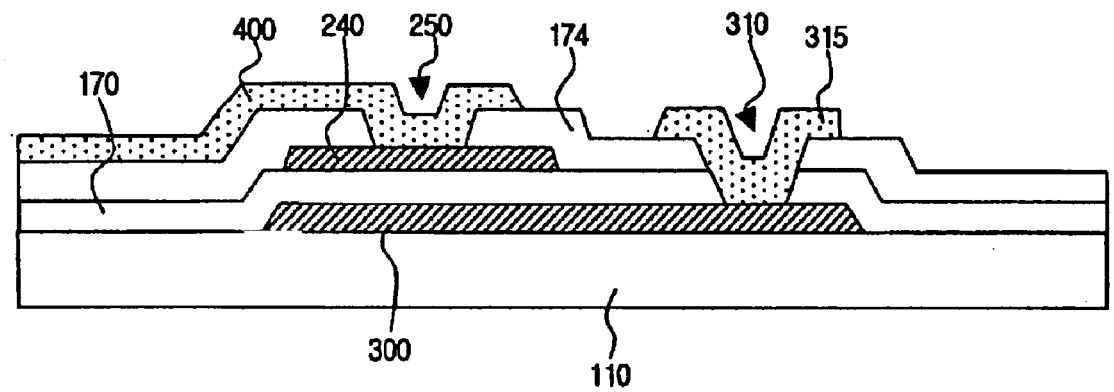
FIG. 11 is a cross-sectional view taken along a line "XI-XI" of FIG. 8.

FIG. 11 is a cross-sectional view taken along a line "XI-XI" of FIG. 8. With reference to FIG. 11, a storage capacitor of the IPS LCD device according to the first preferred embodiment is explained. According the first preferred embodiment, a portion of the common line 300 is used as the first electrode of the storage capacitor "C" of FIG. 8, whereas the capacitor electrode 240 is used as the second electrode thereof. In addition, a portion of the gate-insulating layer 170 interposed between the common line 300 and the capacitor electrode 240 is used as a dielectric layer of the storage capacitor "C".

The gate-insulating layer 170, the capacitor electrode 240, and the passivation layer 174 are sequentially formed on the common line 300. The auxiliary common electrode 315 electrically contacts the common line 300 via a common line contact hole 310, which is formed through the gate-insulating layer 170 and the passivation layer 174. As shown in FIG. 8, the auxiliary common electrode 315 is integrally connected with the plurality of common electrodes 320. As previously explained, the capacitor electrode 240 is electrically connected with the pixel electrode 400 via the capacitor contact hole 250. The plurality of pixel electrodes 400 extend to the capacitor electrode 240 such that the pixel electrodes 400 overlap portions of the capacitor electrode 240.

Figure 12:
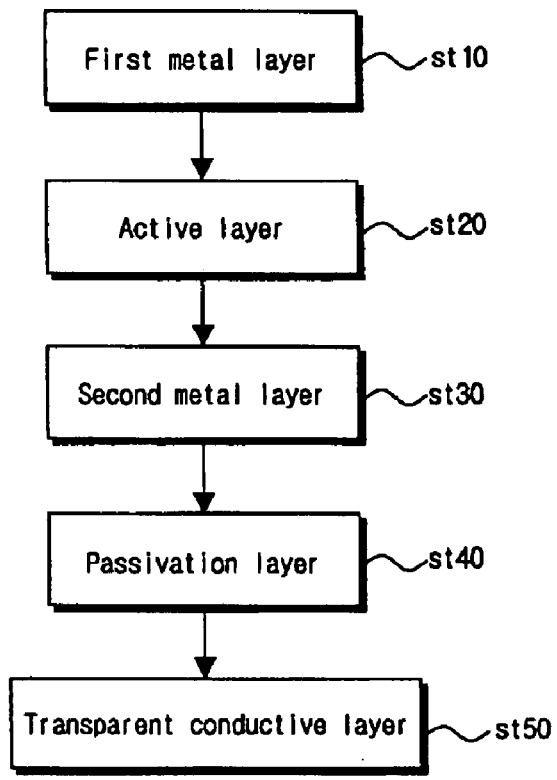
FIG. 12 is a block diagram illustrating a fabrication process for the IPS LCD device according to the first preferred embodiment.

FIG. 12 is a block diagram illustrating a fabrication process for the IPS LCD device according to the first preferred embodiment. With reference to FIG. 12, the fabrication process is explained.

At a first step "st10", a first metal is deposited and patterned on a substrate. That is to say, a gate electrode, a gate line, a common line, and a black matrix are formed on the substrate.

At a second step "st20", an active layer is formed on the substrate where the first metal is patterned. The active layer is formed on the gate line. Specifically, a gate-insulating layer, a pure silicon layer, and a doped silicon layer are sequentially deposited on the substrate, and then, the pure and doped silicon layers are patterned to form the active layer.

At a third step "st30", a second metal is deposited and patterned on the substrate where the active layer is formed. Specifically, a data line, a source electrode, a drain electrode, and a capacitor electrode are formed at the third step "st30".

At a fourth step "st40", a passivation layer is deposited on the second metal patterned on the substrate. Then, the passivation layer is patterned such that a drain contact hole, a capacitor contact hole, and a common line contact hole are formed through the passivation layer. These contact holes are used for connecting various electrodes that will be formed in a later process with the electric lines formed in the previous steps.

At a fifth step "st50", common and pixel electrodes are formed on the passivation layer at the same time. Specifically, a transparent conductive layer is deposited and patterned on the passivation layer such that an auxiliary common electrode, a plurality of common electrodes, an auxiliary pixel electrode, and a plurality of pixel electrodes are formed. The auxiliary common and pixel electrodes are integrally connected with the common and pixel electrodes, respectively, and the plurality of common and pixel electrodes are alternately arranged with each other. In addition, the auxiliary common electrodes electrically contacts the common line via the common line contact hole, whereas the auxiliary pixel electrode electrically contacts the drain electrode via the drain contact hole. Furthermore, an end of the pixel electrode is electrically connected with the capacitor electrode, which is exposed via the capacitor contact hole.

Second Preferred Embodiment

The second preferred embodiment uses an organic passivation layer, which is preferably selected from a group consisting of benzocyclobutene (BCB) and acryl resin. When the above-mentioned organic passivation layer is used, an outermost common electrode 320a (or pixel electrode) can overlap a portion of a data line 200, because an organic material has a relatively small dielectric constant of 3 or less.

Figure 13:
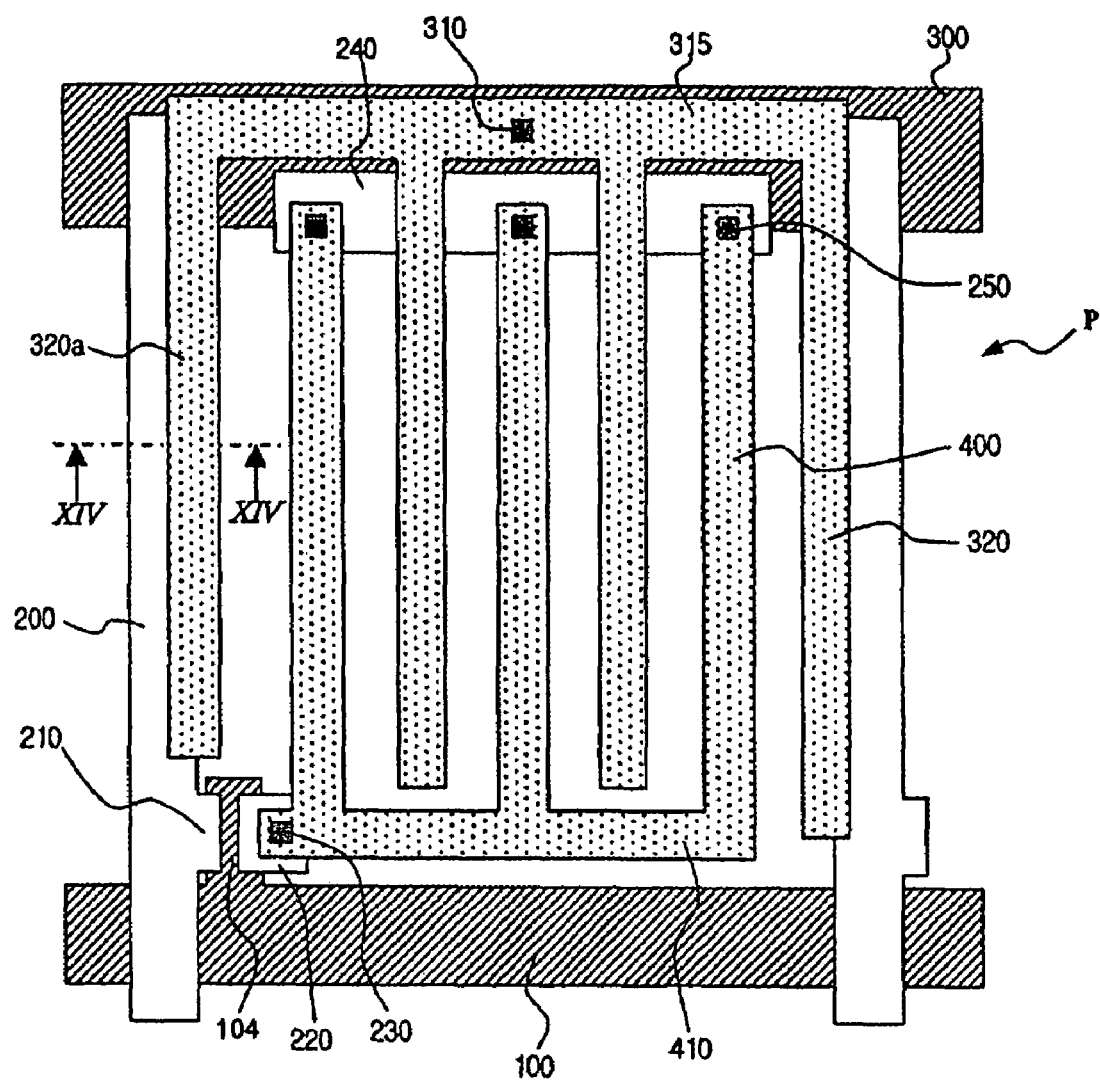
FIG. 13 is a plan view illustrating a unit pixel region of the IPS LCD device according to the second preferred embodiment.
Figure 14:
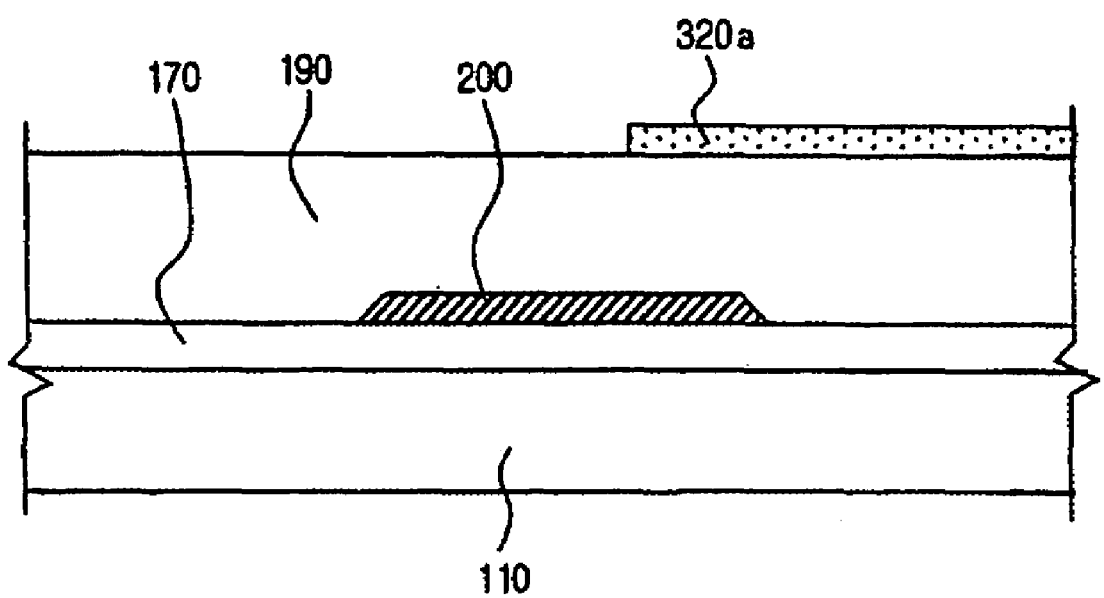
FIG. 14 is a cross-sectional view taken along a line "XIV-XIV" of FIG. 13.

Now, with reference to FIGS. 13 and 14, an IPS LCD device according to the second preferred embodiment is explained. FIG. 13 is a plan view illustrating a unit pixel region "P" of the IPS LCD device according to the second preferred embodiment, whereas FIG. 14 is a cross-sectional view taken along a line "XIV-XIV" of FIG. 13. For simplicity in explaining the second preferred embodiment, description of the same parts as the first preferred embodiment are omitted. In comparison with the first preferred embodiment of FIG. 8, for the second preferred embodiment shown in FIG. 13, the outermost common electrode 320a overlaps a portion of the data line 200. The first preferred embodiment adopts a black matrix to cover an interval between the data line and the outermost pixel electrode (or common electrode). However, the second preferred embodiment has no black matrix. Instead, the overlapped portion of the data line 200 serves as the black matrix of the second preferred embodiment. In other words, because the outermost common electrode 320a overlaps the data line 200 such that there is no interval therebetween, no additional black matrix is needed.

To use the overlapped portion of the data line 200 as the black matrix, an organic passivation layer is used instead of the inorganic passivation layer of the first preferred embodiment. As mentioned above, the organic material has a relatively small dielectric constant of below 3 or less. When the organic passivation layer is used, cross talk is prevented between the data line 200 and the outermost common electrode 320a. The organic passivation layer having the low dielectric constant insulates the data line 200 and the outermost common electrode 320a. Therefore, cross talk current produced along the outermost common electrode 320a by a current of data line 200 is prevented. Thus, the outermost common electrode 320a can overlap the data line 200 such that the overlapped portion of the data line 200 is used as the black matrix.

When the overlapped portion of the data line 200 substitutes for the black matrix of the first preferred embodiment, an aperture ratio thereof improves. That is to say, the first preferred embodiment has an interval between the data line and the outermost common electrode, and the black matrix is used to cover the interval. However, the second preferred embodiment has no interval therebetween. In other words, compared with the first preferred embodiment, the IPS LCD device according to the second preferred embodiment has a wider display area. The display area of the second preferred embodiment is wider than the display area of the first preferred embodiment by an area equal to the interval between the outermost common electrode and the data line of the first preferred embodiment. Therefore, the second preferred embodiment provides a higher aperture ratio than the first preferred embodiment such that the brightness quality of the IPS LCD device improves.

As shown in FIG. 14, for the IPS LCD device according to the second preferred embodiment, the organic passivation layer 190 is formed on the substrate 110 to cover the date line 200. In addition, the outermost common electrode 320a is formed on the organic passivation layer 190 and overlaps date line 200. At this point, the outermost common electrode 320a may overlap the entire width of the data line 200 or just a portion of the data line 200.

A comparison of FIG. 14 with FIG. 10 will show the difference between the first and second preferred embodiments more clearly. Because the second preferred embodiment provides the same IPS LCD device as the first preferred embodiment, except that the organic material is used for the passivation layer of the second preferred embodiment, a detailed explanation is omitted.

As explained above, the IPS LCD device according to the first and second preferred embodiments use transparent common and pixel electrodes instead of the opaque ones to improve the aperture ratio and brightness quality. For example, the transparent common and pixel electrodes provides a 10% increase of the aperture ratio for the IPS LCD device. In addition, because of the improved brightness quality, lower power consumption of the IPS LCD device can be achieved.

In another aspect, because of the organic passivation layer of the second preferred embodiment, there is no need for an interval between the data line and the outermost common or pixel electrode. Therefore, the aperture ratio is further increased for the IPS LCD device such that a higher brightness quality is achieved.

The above-explained IPS LCD device has the following characteristics.

First, a high aperture ratio is achieved, because the common and pixel electrodes are made from a transparent conductive material.

Second, an improved brightness quality is achieved due to the high aperture ratio.

Third, low power consumption is achieved, because the improved brightness quality is produced by an equal power consumption.

Fourth, an improved aperture ratio is achieved by forming the black matrix on the array substrate, according to the first preferred embodiment.

Fifth, a further improved aperture ratio is achieved by insulating the data line and the common electrode (or pixel electrode) using the organic insulating layer of a low dielectric constant. That is to say, because the organic insulating layer decreases cross talk between data line and the common electrode, an interval therebetween can be removed thus improving aperture ratio.

It will be apparent to those skilled in the art that various modifications and variation can, be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device comprising:
    a first substrate and a second substrate;
    a gate line and a common line on the first substrate;
    a first insulating layer over the gate line;
    a data line on the first insulating layer and perpendicular to the gate line;
    a thin film transistor at a crossing point of the gate and data lines; the thin film transistor including a source electrode, a drain electrode and a gate electrode;
    a second insulating layer of an organic material over the first substrate;
    transparent pixel electrodes on the second insulating layer;
    transparent common electrodes on the second insulating layer, wherein the common electrodes and the pixel electrodes form an alternating pattern, the common electrodes including an outermost common electrode adjacent to the data line;
    a capacitor electrode overlapping the common line and connected to the pixel electrodes via a contact hole, wherein the capacitor electrode and common line form a storage capacitor having the first insulating layer therebetween;
    an auxiliary pixel electrode on the second insulating layer and connected to the drain electrode through a contact hole in the second insulating layer;
    an auxiliary common electrode on the second insulating layer, wherein the auxiliary common electrode electrically contacts respective first ends of the common electrodes and electrically contacts the common line via a contact hole through the first and second insulating layers; and
    a liquid crystal layer between the first and second substrates, wherein the outermost common electrode and the data line are on different layers and wherein a portion of the outermost common electrode overlaps the data line.

2. The in-plane switching liquid crystal display device of claim 1, wherein the pixel electrodes are formed of a material selected from the group consisting of indium tin oxide (ITO) and indium zinc oxide (IZO).

3. The in-plane switching liquid crystal display device of claim 1, wherein the common electrodes are formed of a material selected from the group consisting of indium tin oxide (ITO) and indium zinc oxide (IZO).

4. The in-plane switching liquid crystal display device of claim 1, wherein the auxiliary pixel electrode electrically contacts the pixel electrodes.

5. A method of fabricating an in-plane switching liquid crystal display device, comprising:
    depositing and patterning a first metal on a first substrate to form a gate line and a common line on the first substrate, the gate line including a gate electrode;
    forming a first insulating layer over the gate line;
    forming an active layer on the first insulating layer;
    depositing and patterning a second metal on the first insulating layer to form a data line perpendicular to the gate line and source and drain electrodes;
    forming a second insulating layer of an organic material over the first insulating layer, the second metal and the active layer, the second insulating layer having a contact hole;
    depositing and patterning a conductive material on the second insulating layer to form transparent pixel electrodes and transparent common electrodes on the second insulating layer, wherein the common electrodes include an outermost common electrode adjacent to the data line;
    forming a capacitor electrode overlapping the common line and electrically connected to the pixel electrodes via a contact hole, wherein the capacitor electrode and common line form a storage capacitor having the first insulating layer therebetween;
    forming an auxiliary pixel electrode on the second insulating layer and connected to the drain electrode through the contact hole;
    forming an auxiliary common electrode on the second insulating layer, wherein the auxiliary common electrode electrically contacts respective first ends of the common electrodes and electrically contacts the common line via a contact hole through the first and second insulating layers; and
    interposing a liquid crystal layer between the first substrate and a second substrate, wherein the outermost common electrode and the data line are on different layers and wherein a portion of the outermost common electrode overlaps the data line.

6. The method of fabricating an in-plane switching liquid crystal display device of claim 5, wherein the common electrodes and the pixel electrodes form an alternating pattern.

7. The method of fabricating an in-plane switching liquid crystal display device of claim 5, wherein the pixel electrodes are formed of a material selected from group consisting of indium tin oxide (ITO) and indium zinc oxide (IZO).

8. The method of fabricating an in-plane switching liquid crystal display device of claim 5, wherein the common electrodes are formed of a material selected from the group consisting of indium tin oxide (ITO) and indium zinc oxide (IZO).

9. The method of fabricating an in-plane switching liquid crystal display device of claim 5, further comprising forming an auxiliary electrode on the second insulating layer, the auxiliary electrode electrically contacting one of the source and drain electrodes through a contact hole.

10. The method of fabricating an in-plane switching liquid crystal display device of claim 5, wherein the auxiliary pixel electrode electrically contacts the pixel electrodes.

* * * * *